March 24, 1942.  E. C. WELLS  2,277,378
POWER MEANS FOR OPERATING AIRCRAFT CONTROL SURFACES
Filed July 30, 1938  3 Sheets-Sheet 1

Inventor
Edward C. Wells
By
Charles L. Reynolds
Attorney

March 24, 1942.  E. C. WELLS  2,277,378
POWER MEANS FOR OPERATING AIRCRAFT CONTROL SURFACES
Filed July 30, 1938   3 Sheets-Sheet 3

Inventor
Edward C. Wells
By Charles L. Reynolds
Attorney

Patented Mar. 24, 1942

2,277,378

UNITED STATES PATENT OFFICE 2,277,378

POWER MEANS FOR OPERATING AIRCRAFT CONTROL SURFACES

Edward C. Wells, Seattle, Wash., assignor, by mesne assignments, to Boeing Aircraft Company, Seattle, Wash., a corporation of Washington Application July 30, 1938, Serial No. 222,224

33 Claims. (Cl. 244—83)

In the early days of aeronautics, when airplanes were small and exceedingly light, and flew at what are now considered low speeds, the pilot had no difficulty in manipulating his controls, for the control surfaces were small and light, and always of such design that the air forces opposing their swinging from a neutral position were small in the aggregate, and could be easily overcome through the controls and connections employed or readily available. As a control surface (a rudder for example) was swung through an increasing angle from its neutral position, the forces developed by the air stream increased with increasing departure of the surface from neutral position, and acted to return the surface to its neutral position automatically, thus by the "feel" of the control indicating to the pilot the amount by which the control surface had departed from neutral position. Indeed, this "feel" of the control surfaces, being the reaction of the air forces upon a deflected control surface, transmitted back to the pilot's joystick, was valuable in that through it the pilot, in maneuvering, could determine whether the controls were properly set, whether or not he was over-controlling, and conversely, when his controls were again set at neutral position. He became accustomed to this "feel," and felt he could not fly instinctively without it.

As aircraft became larger, and as their speeds increased, the loads upon the control surfaces increased tremendously. To assist in moving the control surfaces there were supplied balancing vanes, aerodynamic balance surfaces, servo tabs, and the like. By assuming a large part, or the major part, of the forces required to overcome resistance to departure from neutral position, these devices assisted in effecting the desired movement of the control surface, making such surfaces movable with an ease that would not have been possible by the muscular effort of the pilot alone, yet a serious and frequent objection to them was that they assumed too large a part of the total forces, either through a part of the range of movement or throughout the entire range—that they destroyed the "feel" of the controls, laying the pilot open to the danger of over-controlling, or, perhaps, of undercontrolling, since he could not, by "feel," determine when the controls were in proper position. This tendency had to be guarded against by so designing the controls, the control surfaces, and the balancing means that the pilot, in all positions of the control surface, was still pushing or pulling against an appreciable resistance, which varied approximately in the ratio that the surface departed from a neutral position.

Again, as airplanes grew still larger, the latter provisions became inadequate, for if the pilot was to be left any "feel" at small angles of departure of the surface from a neutral position, due to the large size of the control surface necessary for adequate control, and due to the necessity of avoiding overcontrolling at small angles of departure, requiring an appreciable resistance to swinging at such small angles, it was found that at larger angles of departure from neutral the air forces resisting swinging of the control surface were so large that, practically speaking, the pilot was unable, by his muscular effort, to swing the control surface through such larger angles.

Obviously power means have been and can be employed to swing control surfaces, but such power means as heretofore devised have taken from the pilot the "feel" of the controls, so that the pilot can tell only from the attitude of his craft, or by his instruments, rather than from the instinctive "feel" thereof, that they are or are not in the proper position. These are unsatisfactory indications, during execution of a maneuver. The first is analogous to determining, not by the adjacent curb, but by the curb a block away, if your automobile is progressing in a straight line; the airplane pilot has no close guide. The second is analogous to driving along a north and south street in a dense fog by a compass; it is scarcely a reliable guide within close limits and in traffic, nor would instruments be. With the multitudinous duties a pilot has to perform, and with the many instruments he has to observe, these should not be added to; it is considered far better practice to permit the pilot to know by the instinctive "feel" of the control whether or not it is in neutral or in some operative position, and whether the airplane is properly executing a given maneuver. Accordingly it is one of the principal objects of this invention to provide a control, in conjunction with an airplane control surface, which leaves to the pilot the proper and accustomed "feel" of the controls, while yet accomplishing movement of the control surface by power means, and thus relieving the pilot of the necessity of employing excessive muscular effort to accomplish movement of the controls, though requiring him to use some appreciable muscular effort, to the end that he may enjoy the "feel" of the controls.

It is still another object to provide such an ararngement as is indicated above, so arranged that the "feel" of the controls will vary in accordance with the departure of the control surface from neutral position, yet which will always reduce the force required to accomplish further departure of the control surface to a value within the capability of the pilot, and without requiring the exertion of undue force, or so much force that the pilot will become unnecessarily fatigued.

It is also an object to operate the controls by power means, yet to insure automatically that the surface will return to neutral position, under control, and will not overrun neutral position.

A further object is to devise a power control means, as indicated, which is applicable to simple surfaces per se, to servo tabs swinging oppositely to the direction the surface is to swing, or to tabs swinging towards the same side as the surface is to swing, to create a graduated change in camber; preferably the latter arrangement is used.

It is an object of the invention to provide such control surface operating means which will be simple and reliable, and which may be embodied in a variety of forms and arrangements in present day aircraft.

With these and other objects in mind, as will appear hereafter, my invention comprises the novel relative arrangement of the parts, and their connection to a control surface and to the controls therefor, as is indicated in the accompanying drawings, described in this specification, and more particularly defined by the claims which terminate the same.

In the accompanying drawings I have shown my invention in diagrammatic fashion, in several arrangements, to indicate how the principles of my invention may be incorporated in various forms.

The principles of my invention may be applied to the operation of various control surfaces, such as the elevators, rudder, and ailerons, and where a control surface generally is referred to, or any particular control surface, it is to be understood that any of the other control surfaces are to be equally included unless the context clearly requires otherwise. The invention, therefore, may be considered as applied to a rudder 2, and will be so described.

Such a rudder 2 is usually mounted behind a relatively fixed vertical stabilizer or fin 1 (as the elevator is behind the horizontal stabilizer, and the aileron is behind the wing), and hinges upon a hinge axis 20 behind the fin and adjacent the leading edge of the rudder. Indeed, the leading edge of the rudder may be formed substantially on a radius about the hinge axis 20, for the rudder need have no aerodynamic balance projecting forwardly of this hinge axis, and this is important in that it avoids any likelihood of icing the rudder's leading edge. To accomplish swinging movement of the rudder about the hinge axis a motor 4 is provided, connected through suitable gearing 40 to a worm screw 14 upon the fin 1, engageable with a worm gear segment 24 carried upon and swingable with the rudder 2, concentrically about its hinge axis 20. The drive may be irreversible or semi-irreversible, as may be preferred. The means thus illustrated are diagrammatical, and any equivalent means may be substituted. Naturally the motor and drive mechanism would be enclosed within the streamline contours of the aircraft structure, wholly or to as great an extent as possible.

It is not sufficient merely to provide means to energize and deenergize the motor, as by a push button in the motor circuit, under the control of the pilot, for this would completely remove from the pilot any semblance of the "feel" of the surface, and of the resistance of the air stream to the movement of the surface. In order to preserve this "feel" of the controls, yet to accomplish movement mainly or wholly by the power means typified by the motor 4, I provide such means as the control tab 3, carried upon the hinge axis 23 at or adjacent the trailing edge of the control surface 2.

Figure 3:
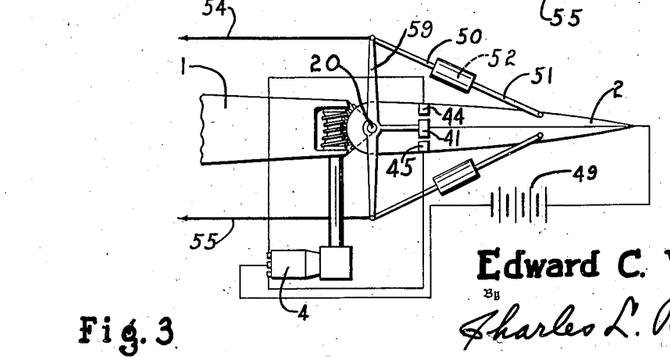
Figure 3 is a similar view, showing a still further modification.

This control tab 3 may be disposed wholly behind the trailing edge of the control surface 2, or may be let into a notch in that trailing edge, or it may constitute all or a major portion of the trailing edge of the control surface 2. Indeed, as shown in Figure 3, it may constitute all of the control surface—the two may be merged into one. It may swing towards the same side as the surface 2 is to swing, as shown, to afford a graduated change of camber through the surfaces 1, 2, and 3 (and this arrangement is preferred), or it may swing oppositely to the control surface 2, as a servo tab. It is so proportioned as to area, with relation to the moment arm of the manual means tending to swing it, that the pilot will have to exert some muscular effort to swing the tab 3 out of the plane of the control surface 2, and indeed to swing it or to maintain it out of the plane of the neutral position of the control surface, which is, generally speaking, in the longitudinal plane which includes the fixed surface 1. Furthermore, the size, proportions and disposition of the control tab 3 are such that with increasing departure of the control surface 2 from its neutral position, and with increasing departure of the control tab 3 from the plane of the control surface 2, the air stream loads resisting such departures from neutral positions or neutral planes vary in accordance with the total or aggregate extent of such departure, so that with increasing swinging of the control surface there is increasing resistance to the tab's movement, and hence apparently to movement of the control surface, notwithstanding the fact that the power available may be adequate to accomplish the surface's movement to any position. Thus with increasing departure of the control surface, notwithstanding the power means, there is, by the size, shape and disposition of the control tab, and through the mechanism associated therewith and to be described, an increasing resistance of the control surface to movement, thus preserving to the pilot the "feel" of the controls.

Figure 1:
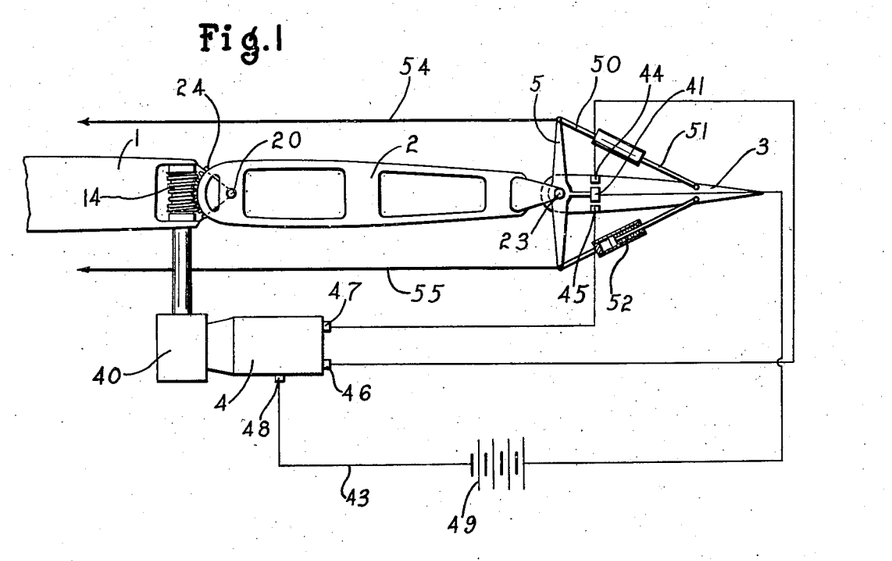
Figure 1 is a diagrammatic section through a control surface and associated parts, indicating the relationship of the several parts of the control surface operating mechanism, in one form of arrangement.

The pilot-controlled device for initiating operation of the motor 4, and the automatic device to terminate that operation, are associated with the control tab 3. The operation or energization of the motor is not initiated until there has been an appropriate amount of movement of the control tab or control elements associated therewith, thus by movement of the tab in opposition to aerodynamic loads, rather than by movement of the whole surface, creating resistance that reacts upon the pilot's manual control. A mast 5, in the form shown in Figure 1, is carried upon the hinge axis 23, but is swingable about this hinge axis independently of the control tab. The mast is intended to be typical of any suitable positively acting means for swinging the tab. Its ends are connected to the control tab, however, through yieldable force-transmitting means, such as the rods 50 and 51 at each side, and the spring 52 interposed between them. The mast in turn is provided with cables 54 and 55, respectively, or their equivalent, extending to the pilot's station, so that the mast is swung under the manual (or pedal) control of the pilot. In other words, it is essential that the pilot exert a certain muscular effort in order to swing the mast 5, and thereby through the yieldable force-transmitting devices to accomplish swinging of the control tab 3. Swinging of the latter from a neutral position is naturally resisted by the forces of the air stream, which tend to maintain it in a neutral plane, and before the pilot can bring the motor into play, he must have manually swung the tab far enough to create such resistance to its further swinging, due to air forces acting upon it, as to overcome the force of the spring 52, and to permit movement of the mast 5 relatively to the tab 3.

Carried upon or swingable with the mast 5 is an electrical contact 41, which may be considered a common return to the power source 49, and carried by the tab 3 are the contacts 44 and 45, connected to opposite terminals 46 and 47 of the reversible motor, while a lead 43 from the opposite terminal of the power source 49 connects to the motor at 48. The motor being a reversible motor, the direction of its rotation is determined by whether contact of the common contact point 41 is made with the contact 44 or with the contact 45.

Assuming all parts to be in neutral position, the air stream loads on opposite faces of the rudder 2 and of the control tab 3 are equalized. Now, however, if it is desired to employ right rudder, the pilot pulls on the cable 54, thereby tending to swing the mast 5. The mast 5, however, is connected to the tab 3 through the spring connection, and almost immediately when an attempt is made to swing the tab 3 to the right, the air stream resists this swinging. The spring at the right transmits the force applied through the cable 54. Eventually the force applied at 54 and the opposing force of the air stream will produce a resultant sufficient in amount and direction to swing the mast 5 relatively to the tab 3, though the latter will have been swung to some extent, and by its swinging will have served to accomplish some of the effects of swinging the entire rudder. When the mast 5 does swing relative to the tab 3, the spring 52 yielding to an extent sufficient to permit this, the contact 41 comes in contact with the contact 44, and the motor 4 is now energized in a direction to initiate swinging of the rudder 2 to the right.

If, however, tension on the cable 54 is not sustained or maintained at a sufficient value, the swinging of the rudder 2 to the right will act as a follow-up device, and will tend to bring the rudder 2 into the plane attained by the right-swung tab 3, and when this occurs, contact will be broken between the contacts 41 and 44. Indeed, air pressure on the now right-swung tab 3 will tend to swing it to the left, relative to the plane attained by the rudder 2, or towards the neutral plane of the fin 1, with the result, if such movement of the tab is permitted, that the contact 41 will make contact with the contact point 45 and reverse movement of the rudder 2 will be initiated. If, however, the tension on the cable 54 is maintained, such reverse movement will not be initiated, but if the tension is only maintained and not increased, no further movement of the rudder in the same direction will be accomplished. In order to accomplish additional movement of the rudder in the same direction it will be necessary to increase the tension on the cable 54 to bring the tab 3 out of the plane of the rudder in the direction or to the side to which the rudder has been moved, and thus the pressure of the air stream on the tab is further increased, but only by such additional swinging of the mast 5, tending to swing the tab further in the same direction and thereby increasing the tension, can the contact 41 be brought again into contact with the contact 44, and further movement of the control surface 2 be initiated in the same direction as before. Thus throughout its movement, and varying in accordance with the amount of departure from the neutral, it is necessary to apply muscular effort to accomplish the power swinging of the rudder. Through such means the accustomed "feel" of the control is retained by the pilot, yet the total resistance which this muscular effort must overcome is never so great as to be outside of the capability of the pilot, nor so great as to unduly fatigue him. Especially is this seen to be true when it is remembered that large airplanes do not ordinarily or frequently make abrupt maneuvers, hence most of the movement of the control surface will be confined to a few degrees only beyond neutral position, requiring only minimum effort.

It is desired to revert at this point to the conditions at the outset of movement of the rudder. If all parts are in neutral position, and only a slight corrective movement is desired, such correction of the attitude of the aircraft may perhaps be accomplished by movement of the tab 3, rather than by movement of the entire control surface 2. Thus if right rudder is needed momentarily to correct a tendency to yaw to the left, tension is applied to the cable 54, applying tension through the right-hand rods 50 and 51 and spring 52. This tends to swing the tab 3 to the right, and it may swing somewhat to the right before air pressure on its right side builds up to an appreciable extent, sufficiently to overcome materially the force of the spring 52, and before there has been any such relative movement of the mast 5 and tab 3 as to bring the contacts together. The right swing of the tab itself may be sufficient to correct the attitude of the aircraft, since the movement has an appreciable aerodynamic effect. Thus the corrective movement of the aircraft may be accomplished, under some conditions, merely by swinging of the tab 3, and without the necessity of initiating power operation of the whole control surface.

Figure 2:
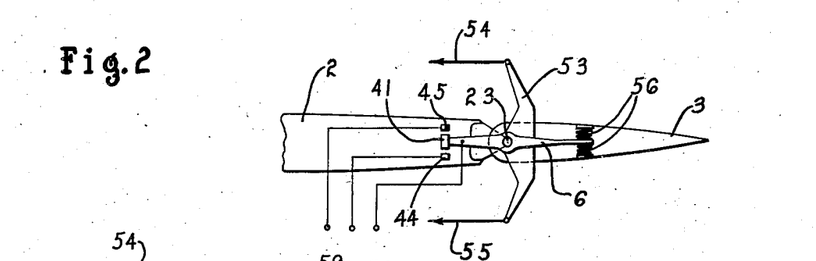
Figure 2 is a similar view showing a modified arrangement.

The arrangement shown in Figure 2 is in a sense a reversal of that shown in Figure 1. The mast 53 in this instance is fast to the tab 3, so that tension upon the cable 54 acts directly through the mast 53 upon the tab 3, swinging the latter directly. Springs 56 are interposed between the tab and either side of an arm 6 which is loosely mounted about the hinge axis 23 to be movable independently of the tab 3. At its opposite end the contact point 41 is carried upon the arm or lever 6, and the contact points 44 and 45 are carried upon the rudder 2.

The operation is substantially the same as that previously described. If right rudder is desired, tension is applied through the cable 54, and the tab 3 is immediately swung to the right, compressing one of the springs 56 and tending to swing the lever 6. When sufficient force has been applied to the lever 6, a suitable resisting force being supplied by the air stream, the lever will swing in a direction and in an amount to contact with the contact 44, and thus to energize the motor to accomplish power swinging of the rudder 2 to the right.

The two forms previously described have embodied control tabs which, while carried upon and movable with the surface to be moved, were movable independently of that surface to some degree. In the form shown in Figure 3, however, the control tab is omitted, or in effect is consolidated with the rudder itself, and the power mechanism is operated when, due to a force applied tending to swing the control surface itself, there has been built up adequate resistance to permit the closing of the motor circuit.

The fin 1 has the rudder 2 hinged to it at 20, as before, and a mast 59 is mounted upon the hinge axis 20, but is swingable independently of the rudder 2. It is connected as before by the links 50, 51, and the spring element 52, but to the rudder itself, rather than to a separate control tab. The common contact 41 is carried by an arm fast to the mast 59, and the cooperating selective contacts 44 and 45 are carried upon the rudder 2.

When it is desired to operate right rudder, tension is applied to the cable 54, tending to swing the mast 59 and through the yieldable spring element 52 tending to swing the rudder 2 to the right. Upon the building up of adequate resistance the contact 41 is brought into contact with the contact 44, energizing the motor 4 and accomplishing power movement of the rudder. The rudder in this instance acts as a follow-up unless tension in the cable 54 is maintained and increased, so that the pilot still maintains the proper "feel" of the control.

Figures 4, 5:
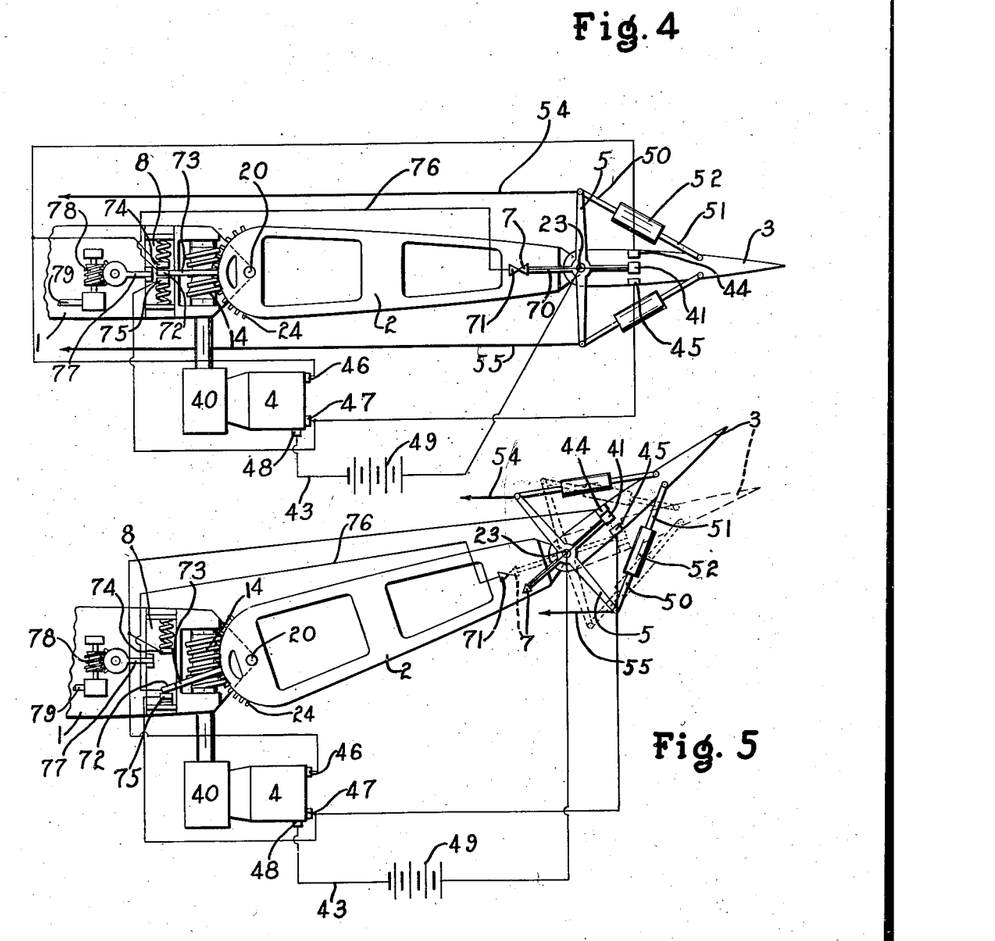
Figures 4 and 5 are diagrams of a further modification, in different positions, including an automatic return-to-neutral arrangement.

The form shown in Figures 4 and 5 is an extension of the form shown in Figure 1, and incorporates means to insure automatically that the control surface will return to neutral position, and neither the control surface nor the tab will remain in any partly deflected position, to the disturbance of the trim of the aircraft. In this way the control surface, though power operated in departure from and in return to neutral position, leaves further to the pilot the "feel" of the surface, corresponding to the strictly manually operated type of control surface wherein unbalanced air loads on opposite sides of the surface tend to neutralize each other and to return the control surface automatically to neutral position.

The mechanism for effecting departure of the control surface from neutral position is or may be identical with that described in conjunction with Figure 1. The mechanism for automatically insuring return to neutral position is added. To this end a contact point 7 is carried upon an arm 70, swingable with the mast 5, and cooperates with a contact point 71 fixed upon the control surface 2, in such a position that the contact points 7 and 71 will make contact only when the control tab 3 is in the same plane as the control surface 2; that is, when the tab is in a neutral plane relative to the control surface 2, though it may not be in a neutral plane as respects the fixed surface 1. In addition a contact point 72 is carried upon an arm 73, which is fixed to swing with the control surface 2 about its hinge axis 20. Closely adjacent the contact point 72, at either side thereof, are the spring-mounted contact points 74 and 75. When the control surface 2 is in neutral position with respect to the fixed surface 1 the contact point 72 lies midway between, spaced from but closely adjacent the two spring-mounted contact points 74 and 75. The contact 71 is connected by a lead 76 with the contact 72, and the respective contacts 74 and 75 are connected to the opposite terminals 46 and 47, respectively, of the motor 4, whereas the contact 7 is connected to the opposite side of the power source 49.

So long as the control surface 2 is in neutral position with respect to the fixed surface 1 the circuit just described is broken by reason of the fact that the contact point 72 is out of contact with each of its cooperating contact points 74 and 75. It matters not that the control tab 3 is or is not in neutral position with respect to the control surface 2. If it is in neutral position and the contact point 7 is in contact with the contact point 71, the circuit is still broken between 72 on the one hand and 74 or 75 on the other hand. In order to accomplish departure of the control surface 2 from neutral position under power means it is necessary to accomplish departure of the control tab 3 from its neutral position, and prior to that to accomplish swinging of the mast 5. Immediately the mast 5 is swung from the position it occupies in Figure 4 towards a position such as is shown in Figure 5, contact is broken between the points 7 and 71. At that instant the circuit including the points 71 and 72 is broken at two places. However, as soon as the contact points 41 and 44 engage, the motor is energized to swing the control surface 2 away from its neutral position, and as soon as deflection of the control surface 2 commences, the contact point 72 engages, in this instance, the contact point 75. The motor reverse, or return circuit, including the contact points 71 and 72, is now closed at this point, but is still broken as between the points 7 and 71. It follows that the deflecting circuit, rather than the return circuit, maintains control of the movement of the control surface, and parts are in the full-line position of Figure 5.

When the control surface has swung to the limit of its desired deflection, the tension on the control 54 is slacked off, and the air loads on the control tab 3 tend to swing it towards the dash-line position of Figure 5. If it is not held by the pilot, but is permitted to return to the dash-line position, the contacts 7 and 71 reengage, and the reversing circuit is now fully closed, through the latter points as well as between the points 72 and 75. In this position the deflecting circuit is broken by disengagement of the points 41 and 44, which must occur before the reversing circuit can be closed at 7, 71; the return circuit governs operation of the motor, and the motor is reversed, causing the control surface 2 to return to neutral position. When the surface 2 reaches its neutral position the circuit is automatically broken between the points 72 and 75. Should the control tab 3 swing from the full line position of Figure 5 past the dash line position to the opposite side of its neutral position with respect to the control surface 2, the only effect will be to close two reverse circuits through the motor 4, and air loads on the control tab as the control surface approaches its neutral position will cause the tab to swing back until it lies in the same plane as the control surface 2.

Such an arrangement not only retains to the pilot the "feel" of the control surface as it is deflected from neutral position, but it gives him the same effect and the same sensitivity of "feel" as the air loads effect automatic return of the surface, by operation of the power means, and in a controlled manner, to neutral position. No positive action on the part of the pilot is required except to slack off the tension on the cable 54, and merely slacking off on this cable, without any positive pull on the other cable 55, effects automatic return of the surfaces to neutral position, as would be the case in the simple controls of the early airplanes.

In the description above it has been assumed that the contact points 74 and 75 are fixed in position with respect to the fixed control surface 1, and with respect to the neutral position of the contact point 72. However, by mounting the contact points 74 and 75 so that they are adjustable relative to the neutral position of the contact point 72, the neutral position of the control surface 2 may be adjusted for trimming the surface, and so that it stands normally in a somewhat inclined position with respect to the plane of the fixed surface 1. Thus the contact points 74 and 75 with their respective spring mountings may be supported upon a carriage 8 guided in the fixed surface 1 for movement transversely thereof, the transverse movement being under control of a finger 77 carried upon the fixed surface 1 and engageable with the carriage 8. The position of the finger 77 may be adjusted by power means, generally indicated at 78, and terminating in an element 79 which is adjustable by the pilot. It will be understood that this adjustment is not for the purpose of effecting a momentary control or rectifying movement of the control surface 2, nor the control tab 3, but is for the purpose of giving the control surface 2 a set for trimming purposes, so that in its neutral position it is somewhat inclined with respect to the fixed surface 1 in such a direction as to properly trim the aircraft against an unbalanced force.

Figure 6:
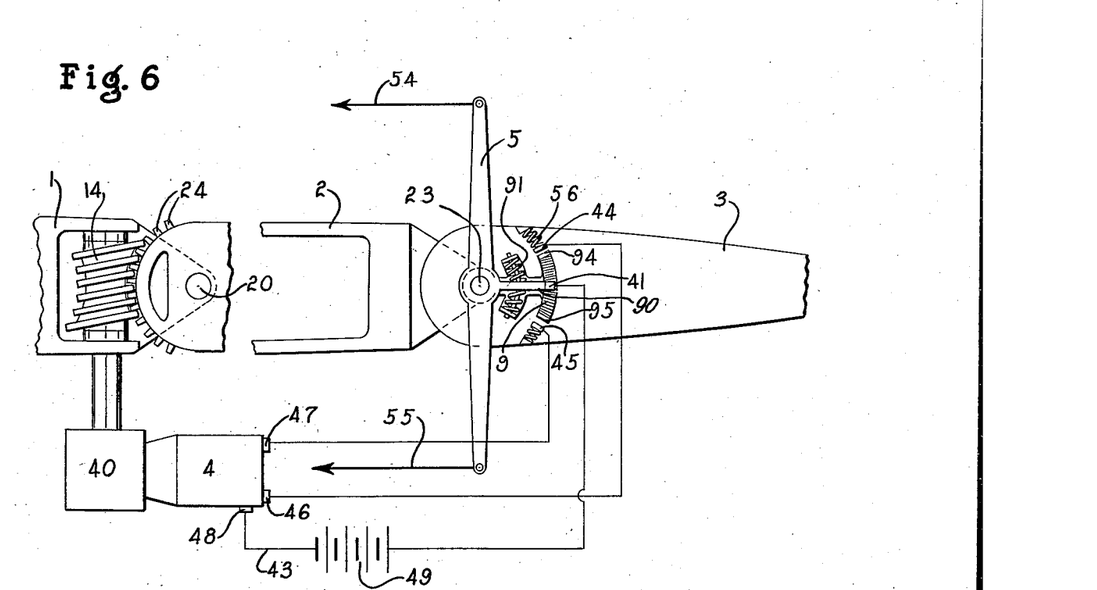
Figures 6 and 7 are diagrammatic showings of a further modification in or in addition to the basic system.
Figure 7:
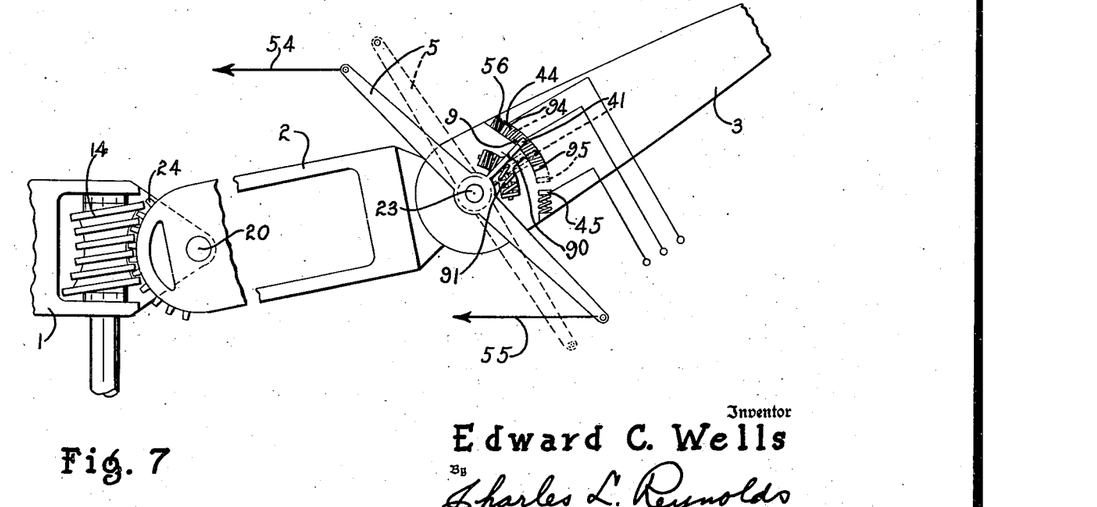

In some cases, in order to preserve to the fullest degree the "feel" of the control surfaces, and to make the movement of the control surface even more dependent upon or proportionate to the manual force exerted to swing the surface, the arrangement shown in Figure 6 may be employed. Here springs 56' are inserted between fixed abutments on the tab 3 and contact points 44 and 45. The contact point 41 is mounted upon an arm swingable with the mast 5, independently of the control surface 3, but does not itself contact directly with the contact points 44 or 45. Instead the arm 41 acts as a rheostat wiper or switch arm, moving over a rheostat 9 provided with the contacts 94 and 95 at its opposite ends, and carried upon an arm 90 which is swingable freely about the pivot axis 23 of the mast and control surface, independently of each. Centering springs 91 serve to maintain the contact point 41 centered or equidistant between the ends of the rheostat 9 and its contacts 94 and 95, but are yieldable to permit movement of the contact point 41 relative to the rheostat 9 when the latter encounters sufficient resistance. The yieldable elements 50, 51, 52 may be used or not; the springs 56' to a large degree assume the functions of springs 52, and render the latter unnecessary.

Again, assuming right rudder to be desired, the cable 54 is pulled, and the contact 41 is swung, carrying with it the rheostat 9 on its arm 90, and effecting contact between the contact point 94 and the contact point 44. The motor is energized in the proper direction, but because the contact point 41 is at such a position with relation to the rheostat 9 as to interpose the maximum of resistance between the contact points 41 and 94, the action of the motor is weak. Upon increased tension in the cable 54 the spring 56' is compressed, and eventually reaches such compression that the resistance of the contact point 41 to movement over the rheostat switch is overcome, and the contact point 44 moves relative to the rheostat switch 9 to approach the contact point 94, and to cut out some of the resistance of the rheostat. The closer the contact point 41 approaches to the contact point 94, the less is the resistance in the motor circuit, and such movement is accomplished by reason of increased tension in the cable 54. Consequently the more the pull on the cable 54, the greater the power and speed of the motor 4. Upon slacking off on the cable 54 the spring 56' tends to return the rheostat switch 9 to its position of equilibrium, and upon slacking off of the spring 56' the springs 91 tend to return the contact point 41 to a neutral position relative to the rheostat switch 9, with the result that with the two cables 54 and 55 both slack or equally tensioned, parts will return to the neutral position, but in the last part of the movement the motor circuit will have increasing resistance incorporated in it, so that it will slow down. Such an arrangement, of course, is only intended to illustrate a principle, namely, that the action of the motor, and consequently the movement of the control surface, may be made even more fully dependent upon the muscular force applied to swing the control surface, thereby leaving to the highest degree possible the "feel" of the controls with the pilot, though providing power means to accomplish the actual movement of the control surface.

The description has referred to an electrical motor and to electrical means for accomplishing the movement of the control surface, but this was largely for convenience of description and understanding, and it will be evident that any suitable power operating means might be employed; that the effect of the power means or its degree of rapidity of action may be controlled variably in accordance with the extent of movement of a mast 5, for instance, relatively to a control surface or control tab. Also there may be substituted, for the electrical follow-up means or operating controls or transmission, hydraulic means, pneumatic means, or any like equivalent means, and these could be variably controlled, as by more or less resistance to flow, in accordance with the principle illustrated in Figure 6.

What I claim as my invention is:

1. Aircraft control means comprising, in combination, a control surface movable from a neutral position to a control position, inclined relative to the air stream, a control tab similarly mounted and movable, manually operable means so to move the control tab, power means operatively connected so to move the control surface, and means associated with the control tab, operable following departure of the latter from its neutral position, to energize the power means to effect corresponding movement of the control surface.

2. In combination with a hingedly mounted aircraft control surface, a control tab hingedly mounted at the trailing edge thereof, means operable from the pilot's station to swing said control tab, power means operatively connected to swing the control surface to either side of its neutral position, and means associated with the control tab, operable by swinging of the latter in one direction or the other, to initiate operation of the power means for swinging of the control surface in the corresponding direction.

3. Aircraft control means comprising, in combination, a control surface swingable about a hinge axis adjacent its leading edge from a neutral position to a control position at either side of the neutral position, a control tab swingable about an axis adjacent its leading edge and located at the trailing edge of the control surface, from a neutral position to an operative position at either side of the neutral position, yieldable means to maintain the control tab in, and acting to return it to, neutral position, means operable from the pilot's station to swing the control tab away from neutral position, in opposition to said yieldable means, power means operatively connected to swing the control surface away from or to return it to neutral position, and means operable upon departure of the control tab from neutral position to energize the power means to initiate swinging of the control surface.

4. Aircraft control means comprising, in order from front to rear, a fixed surface, a control surface hingedly mounted thereon, and a control tab hingedly mounted on the control surface, manually operable means to swing the control tab from a neutral position, substantially in the plane of the control surface, to an inclined operative position, power means to swing the control surface from a neutral position, substantially in the plane of the fixed surface, to inclined control positions, and means operable in accordance with swinging of the control tab from its neutral position towards one side of the control surface and the fixed surface, to energize the power means to initiate swinging of the control surface towards the same side of the fixed surface.

5. Aircraft control means comprising a control surface swingable about a hinge axis adjacent its leading edge, from a neutral position to an operable position at either side, power means energizable to swing said control surface, a control tab swingable about a hinge axis adjacent its leading edge from a neutral position to an operable position at either side, manually operable tension means to swing said control tab, including a yieldably extensible means to produce swinging of the tab only after establishing a predetermined tension in said tension means, and means associated with the tab, and operable by its swinging, thus induced, to energize the power means and thus to initiate swinging of the control surface.

6. In combination with an aircraft control surface swingable from a neutral position to an operative position, inclined to the air steam, and with power means so to swing the control surface, pilot-operated manual means to govern the movement of said control surface, and an operative connection between the manual means and the power means such that the pilot may "feel" the control surface as it swings, said operative connection including a tab swingable from a neutral position into a position inclined to the air stream in accordance with like swinging of the control surface, yieldable means to swing said tab in opposition to the forces of the air stream, and means operable by such swinging movement of the tab to correspondingly energize the power means to initiate swinging of the control surface.

7. In combination with an aircraft control surface swingable from a neutral position through a plurality of successive operative positions, in each of which it is urged towards neutral position by the force of the air stream, and more or less in accordance with the amount of its departure from neutral position, power means so to swing the control surface, pilot-operated manual means to effect and govern the extent of swinging movement of the control surface, and an operative connection between the manual means and the power means such that the pilot may "feel" the control surface as it swings, said operative connection including a tab hingedly mounted upon the control surface to swing from a neutral position, substantially in the plane of the control surface, to an operative position, inclined from the control surface into the air stream in the direction the control surface is to move, means interposed between the manual means and said tab, and yieldable within limits under the influence of air forces resisting swinging of the tab and arising from increased inclination of the tab from the plane of the neutral position of the control surface, so to swing the tab upon the creation of a predetermined force overcoming the resisting force, and means operable by such swinging of the tab, relatively to the control surface, to energize the power means and to initiate movement of the control surface in the direction the tab has been swung, the several elements of the operative connection between the manual means and the power means being so disposed and arranged that the control surface, as it follows up the swinging of the tab, tends to decrease the force acting to swing the tab, thereby, unless such force is manually maintained, swinging the tab back towards the attained plane of the control surface, and deenergizing the power means, to limit swinging of the control surface in this direction to its attained operative position.

8. In combination with an aircraft control surface swingable from a neutral position through a plurality of successive operative positions, in each of which it is urged towards neutral position by the force of the air stream, and more or less in accordance with the amount of its departure from neutral position, power means so to swing the control surface, pilot-operated manual means to effect and govern the extent of swinging movement of the control surface, and an operative connection between the manual means and the power means such that the pilot may "feel" the control surface as it swings, said operative connection including a tab hingedly mounted upon the control surface to swing from a neutral position, substantially in the plane of the control surface, to an operative position, inclined from the control surface into the air stream in the direction the control surface is to move, means interposed between the manual means and said tab, and yieldable within limits under the influence of air forces resisting swinging of the tab and arising from increased inclination of the tab from the plane of the neutral position of the control surface, so to swing the tab upon the creation of a predetermined force overcoming the resisting force, and means operable by such swinging of the tab, relatively to the control surface, to energize the power means and to initiate movement of the control surface in the direction the tab has been swung, the several elements of the operative connection between the manual means and the power means being so disposed and arranged that the control surface, as it follows up the swinging of the tab, tends to decrease the force acting through said yieldable means to swing the tab, thereby, in conjunction with air forces tending to return the tab to the neutral position of the control surface, and unless the original tab-swinging force is manually maintained, swinging the tab back through the attained plane of the control surface towards the neutral plane of the control surface, in turn reversing the power means and initiating a return swing of the control surface.

9. In combination with an aircraft control surface swingable from a neutral position, relative to the air stream, through successive operative positions at either side of such neutral position, power means to supply torque so to swing the control surface, means manually movable by the pilot to govern swinging of the control surface, and means yieldable in accordance with resistance of the air stream to the departure of the control surface from neutral position, and operable, upon the attainment and maintenance of a predetermined resistance, to energize the power means to swing the control surface in a direction to increase such resistance.

10. In combination with an aircraft control surface movable from a neutral position, relative to the air stream, through successive operative positions each of which in turn produces increased resistance to movement away from neutral position, mechanical means manually movable by the pilot to govern such movement, including an element operatively connected to be moved by the pilot but the movement of which is resisted by departure of the control surface from neutral position or from any operative position to another farther removed from neutral position, and power means operable by the production of a given resistance to movement of said element, in any position of the control surface, to initiate movement of the control surface in a direction away from its neutral position.

11. In combination with an aircraft control surface movable from a neutral position, relative to the air stream, through successive operative positions each of which in turn produces increased resistance to movement away from neutral position, mechanical means manually movable by the pilot to govern such movement, including an element operatively connected to be moved by the pilot but the movement of which is resisted by departure of the control surface from neutral position or from any operative position to another farther removed from neutral position, power means operable by the production of a given resistance to movement of said element, in any position of the control surface, to initiate movement of the control surface in a direction away from its neutral position, and means movable in accordance with movement of the control surface thus initiated, to deenergize the power means after predetermined movement away from neutral position.

12. In combination with an aircraft control surface movable from a neutral position, relative to the air stream, through successive operative positions each of which in turn produces increased resistance to movement away from neutral position, mechanical means manually movable by the pilot to govern such movement, including an element operatively connected to be moved by the pilot but the movement of which is resisted by departure of the control surface from neutral position or from any operative position to another farther removed from neutral position, power means operable by the production of a given resistance to movement of said element, in any position of the control surface, to initiate movement of the control surface in a direction away from its neutral position, and a tab on the control surface, movable relative thereto and disposed in the air stream, and similarly increasingly resistant to movement of the control surface from neutral position, said tab being operatively connected to the power means to deenergize the latter after predetermined movement of the control surface from any given position to one more distant from neutral position, and to reverse the power means to initiate return movement of the control surface.

13. In combination with an aircraft control surface swingable from a neutral position, relative to the air stream, through successive operative positions at either side of such neutral position, a control tab swingably mounted upon the control surface, means manually operable by the pilot and directly but yieldably connected to the control tab to swing the latter relatively to the control surface, in the direction the control surface is to swing, power means to swing the control surface, and means operable by swinging of the tab relative to the control surface to initiate such swinging of the control surface, the follow-up movement of the latter effecting reverse relative swinging of the tab, to deenergize the power means.

14. In combination with an aircraft control surface swingable in each direction from a neutral position relatively to the air stream, about a hinge axis adjacent its leading edge, a control tab carried upon and adjacent the trailing edge of the control surface, and swingable in each direction from a neutral position, in the general plane of the control surface, about a hinge axis adjacent its own leading edge, manual means operable by the pilot so to swing said tab, and including a mast manually swingable about the hinge axis of but independently of the control tab, tension members, each including an extensible spring, connecting each arm of the mast with the corresponding side of the tab, to swing the latter when and during such time as the spring overcomes the resistance of the airstream, acting upon the tab, and tending to maintain the tab at a given angle relative to the mast, a reversible electric motor or the like operatively connected to swing the control surface in either direction, a pair of contacts carried by the tab and connected respectively in oppositely energizable motor circuits, and a common contact swingable with the mast and engageable selectively with one or the other of the pair of contacts, thereby, when a motor circuit is closed, swinging the control surface in a direction to follow the movement of the mast and tab.

15. In combination with an airfoil surface hingedly mounted adjacent its leading edge to swing from a neutral position, relatively to the air stream, to an operative position at either side thereof, manual means to govern swinging of said surface, including spring means interposed between the pilot's station and the surface, and extensible under the influence of the resultant of the pilot's pull which tends to swing the surface in a given direction, and the resistance of the air stream to the surface's swinging in that direction, power means to swing the surface, and means operable in accordance with extension of the spring means beyond a given value, due to increase in that resultant, to energize the power means to swing the surface in the direction corresponding to the pilot's pull.

16. In combination with an aircraft control surface movable from a neutral position to and through a plurality of operative positions, the resistance of the air stream to such movement increasing with increased departure of the surface from neutral position, power means so to move said surface, and manual means to initiate and control operation of the power means, said manual means including a mechanical force-transmitting element, a member resisting movement of the latter in the approximate ratio of the resistance of the surface to movement, and a control element to energize the power means after the force-transmitting element has accomplished a movement and overcome a resistance corresponding to the resistance of the control surface to movement from its then attained position, in the indicated direction.

17. Aircraft control means comprising, in combination, a control surface deflectable from a neutral position, power means so to deflect the control surface, in opposition to air loads, which loads vary in accordance with the degree of deflection from neutral position, and means operable by muscular force to govern the operation of the power means, the latter means being so formed and arranged, relatively to the control surface, that the amount of muscular force required varies approximately with the air loads upon the control surface.

18. Aircraft control means comprising, in combination, a control surface deflectable from a neutral position, power means so to deflect the control surface, in opposition to air loads, which loads vary in accordance with the degree of deflection from neutral position, and means operable by muscular force to govern the operation of the power means, the latter means being so formed and arranged, relatively to the control surface, that the amount of muscular force required varies approximately with the air loads upon the control surface, and power means automatically operable, upon relaxation of the muscular force, to return the deflected control surface to neutral position.

19. Aircraft control means comprising, in combination, a control surface swingeable from a neutral position, wherein the air loads upon its opposite faces are substantially neutralized, a control tab swingably mounted upon the trailing edge of the control surface, power means, including a reversible motor, to swing said control surface, motor-control means associated with the tab and control surface, and operable by swinging of the tab out of the plane of the control surface to energize the motor in a direction to effect departure of the control surface in a given direction from its neutral position, and further motor control means operable upon reverse swinging of the tab, relatively to the control surface, to reverse the motor to effect return of the control surface towards neutral position.

20. Aircraft control means comprising, in combination, a control surface swingable from a neutral position to an operative position, inclined to the air stream, reversible power means so to swing the control surface, and to return it to neutral position, pilot-operated manual means to govern the movement of said control surface, and an operative connection between the manual means and the power means such that the pilot means and the power means such that the pilot may "feel" the control surface as it swings, said operative connection including a tab swingable from a neutral position into a position inclined to the air stream in the direction the control surface is to swing, yieldable means to swing said tab in opposition to the resisting air load, means operable by such swinging movement of the tab to correspondingly energize the power means to initiate swinging of the control surface in the direction towards which the tab has been swung, and means operable automatically by reverse swinging of the tab, relatively to the control surface, to reversely energize the power means to initiate return swinging of the control surface.

21. Aircraft control means comprising, in combination, a control surface movable from a neutral position to a control position, inclined relatively to the air stream, power means energizable so to move the control surface, manually operable controls, and means operable in accordance with the manual force exerted through said manual controls, to variably energize the power means, and to accomplish movement of the control surface proportionate to the manual force thus exerted.

22. Aircraft control means comprising, in combination, a control surface deflectable from a neutral position, power means so to deflect the control surface, in opposition to air loads, which loads vary in accordance with the degree of deflection from neutral position, and means operable by muscular force to govern the operation of the power means, the latter means being so formed and arranged, relatively to the control surface, that the amount of muscular force required varies approximately with the air loads upon the control surface, power means automatically operable, upon relaxation of the muscular force, to return the deflected control surface to neutral position, and means to adjust the neutral position of the control surface, thereby to deflect such surface in neutral position with respect to the line of flight.

23. In combination with an aircraft control surface movable from a neutral position of minimum air load, through a plurality of operative positions successively more distant from the neutral position, the control surface being so mounted, with respect to the relative airflow, that the air load upon it progressively increases in accordance with the extent of the surface's departure from the neutral position, power means operatively connected to the control surface to effect such departure, and control means for said power means, said control means including an element for energizing the power means, a pilot-operated element movable from a neutral position in correspondence with departure of the control surface from the latter's neutral position, and operatively connected to the energizing element to move the latter correspondingly, thereby to effect corresponding energization of the power means and movement of the control surface, an auxiliary surface exposed to and movable relative to the airstream, and operatively connected to the control surface, for movement, in correspondence with the movement of the control surface away from the latter's neutral position, through successive positions wherein the air load upon said auxiliary surface progressively increases, and operative connections between said auxiliary surface and the energizing element to impose a force upon the latter, varying in accordance with the air loads upon the auxiliary surface, and acting in opposition to the force applied to the energizing element by the pilot-operated element, whereby the instantaneous force acting upon the energizing element is the resultant of the normally opposed forces imposed by the pilot-operated element and the auxiliary surface.

24. In an aircraft, in combination, a control surface movable from a neutral position through successive operative positions of increasing air loads, an auxiliary surface likewise movable from a neutral position through successive operative positions of increasing air loads, means operatively connecting the two surfaces for corresponding movements, the two surfaces being so proportioned, and so loaded by the relative airstream, that the air load upon one, in any given position, bears a definite relationship to the air load upon the other, in the corresponding position; pilot-operated means for initiating movement of the control surface; servo means operable by the pilot-operated means to move the control surface correspondingly, and hence to entrain corresponding movement of the auxiliary surface; and means operable by the auxiliary surface, under the influence of change in the air load upon it as it is thus moved, to deenergize the servo means when the opposed forces of the auxiliary surface and of the pilot-operated means, effective at the servo means, come into substantial equilibrium.

25. In an aircraft, in combination, a control surface movable from a neutral position through successive operative positions of increasing air loads, an auxiliary surface likewise movable from a neutral position through successive operative positions of increasing air loads, means operatively connecting the two surfaces for corresponding movements, the two surfaces being so proportioned, and so loaded by the relative airstream, that the air load upon one, in any given position, bears a definite relationship to the air load upon the other, in the corresponding position, pilot-operated control means, opposed automatic control means operatively connected to the auxiliary surface, and servo means controllable under the joint influence of the pilot-operated and the automatic control means, and operable to move the control surface, in one direction or another, or to hold it stationary, in accordance with the resultant of force as between the said two control means.

26. In an aircraft, in combination, a control surface movable from a neutral position through successive operative positions of increasing air loads, an auxiliary surface likewise movable from a neutral position through successive operative positions of increasing air loads, means operatively connecting the two surfaces for corresponding movements, the two surfaces being so proportioned, and so loaded by the relative airstream, that the air load upon one, in any given position, bears a definite relationship to the air load upon the other, in the corresponding position; pilot-operated control means, opposed automatic control means operatively connected to the auxiliary surface, servo means controllable under the joint influence of the pilot-operated and the automatic control means, and operable to move the control surface, in one direction or another, or to hold it stationary, in accordance with the resultant of force as between the said two control means, and limitedly yieldable lost-motion means interposed in said control means, to dampen and prevent energization of the servo means and consequent movement of the control surface under the influence of transient variations in the said resultant of force.

27. In an aircraft, in combination, a control surface movable from a neutral position through successive operative positions of increasing air loads, two complemental and relatively movable energizing members normally relatively positioned in a non-operative position, and both mounted for movement in correspondence with movement of the control surface, power means energizable by said members when they are relatively moved from a non-operative position into energizing position, pilot-operated means to move one such member from non-operative position in a direction, relative to the complemental member, to effect departure of the control surface from neutral position, and thus to progressively increase the air load upon such surface, resisting its departure, the movement of said complemental member in correspondence with movement of said control surface, and under the influence of such increasing air loads, tending to move said complemental energizing member oppositely to the pilot-controlled member, the parts being so organized and arranged that when the pilot-applied load and the resisting air load, as applied to the complemental energizing members, come into equilibrium, the two energizing members will be disposed relatively in a new non-operative position, and further movement of the control surface will cease.

28. In an aircraft having a fixed surface, a movable surface hinged to said fixed surface and a second movable surface hinged to said first movable surface, control mechanism for moving said second movable surface with respect to said first movable surface out of alignment therewith, and means, responsive to operation of said control mechanism such as to produce disalignment of the said movable surfaces, to move said first movable surface towards alignment with said second movable surface.

29. In an aircraft having a fixed stabilizing surface, a movable trim surface hinged to said fixed surface and a movable control surface hinged to said trim surface, control mechanism for moving said control surface with respect to said trim surface out of alignment therewith, and means, responsive to operation of said control mechanism such as to produce disalignment of the said movable surfaces, to move said trim surface towards alignment with said control surface.

30. In an aircraft having a fixed surface, a movable surface hinged to said fixed surface, and a second movable surface hinged to said first movable surface, control mechanism for deflecting one of said movable surfaces with respect to its supporting surface out of alignment therewith, and means thereafter operable in response to such deflection of said initially moved surface in either direction to move the other of said movable surfaces always towards alignment with the initially moved surface.

31. In an aircraft having a fixed surface, a movable surface hinged to said fixed surface, and a second movable surface hinged to said first movable surface, control mechanism for deflecting one of said movable surfaces with respect to its supporting surface out of alignment therewith, and means, including servo mechanism for moving the other of said movable surfaces and a control device therefor responsive to such deflection of said initially moved surface, in either direction, to initiate movement of the other such movable surface always towards alignment with the initially moved surface.

32. In an aircraft having a fixed surface, a movable surface hinged to said fixed surface, and a second movable surface hinged to said first movable surface, control mechanism for deflecting one of said movable surfaces with respect to its supporting surface out of alignment therewith, and means, including an irreversible device, operable in response to such deflection of said initially moved surface, in either direction, to move the other of said movable surfaces always towards alignment with the initially moved surface.

33. In an aircraft having a fixed surface, a movable surface hinged to said fixed surface, and a second movable surface hinged to said first movable surface, control mechanism for moving said second movable surface with respect to said first movable surface out of alignment therewith, and means, including an irreversible device, responsive to operation of said control mechanism such as to produce disalignment of the said movable surfaces, to move said first movable surface towards alignment with said second movable surface.

EDWARD C. WELLS.